April 18, 1944.　　　　B. R. HARRIS　　　　2,346,682
TREATMENT OF LIQUID EGG MATERIAL
Filed June 7, 1940　　　4 Sheets-Sheet 1

April 18, 1944. B. R. HARRIS 2,346,682
TREATMENT OF LIQUID EGG MATERIAL
Filed June 7, 1940 4 Sheets-Sheet 4

INVENTOR.
Benjamin R. Harris
BY McLaughlin & Wallenstein
ATTORNEYS

Patented Apr. 18, 1944

2,346,682

UNITED STATES PATENT OFFICE 2,346,682

TREATMENT OF LIQUID EGG MATERIAL

Benjamin R. Harris, Chicago, Ill.

Application June 7, 1940, Serial No. 339,253

13 Claims. (Cl. 99—113)

My invention relates to filtering and processing liquid egg material.

It has hitherto been proposed to subject liquid egg material to various filtering and homogenizing processes so that improved products would result when such liquid egg material was subsequently subjected to a freezing or a drying or other operation in accordance with processes known in the art. Thus, for example, it has been proposed to pass liquid egg material through a line strainer or filter, forcing it therethrough under pressure. While this process results in a definite improvement in the appearance and characteristics of the egg material, particularly from the standpoint of homogeneity of the resulting product, it has various disadvantages, chief among which is the frequent necessity for discontinuing operation and cleaning off the heavy accumulation of chalaza, stringy portions, shells and the like. The frequency with which such cleaning operations are required depends, of course, upon the size of the screen or filter and the amount of liquid egg material which is passed therethrough. In general, however, the process possesses the definite disadvantage indicated. Another objection to this process resides in the fact that there is considerable wastage of egg material by reason of the aforementioned accumulations on the surface of said filter or screen. These accumulations contain egg material which, when recovered, can be sold only as a second-grade product.

Another method which has been suggested is to grind the liquid egg material by the use of burr stones or the like in order to break up the chalaza and stringy portions and to produce a uniform, homogeneous product. One of the chief disadvantages of this process is the fact that it is not easily or simply carried out and the resulting products are not as satisfactory as might be desired. For example, for some unknown reason, when liquid egg whites are subjected to this grinding operation and subsequently fermented and then dried, the products produced are not as uniform as might be expected and the process results in substantial losses by virtue of the non-uniformity of the fermentation. Thus, two grades of dried product are produced thereby resulting in large losses since a substantial amount of the product cannot be considered as constituting a grade A product and must be sold at a cheaper price than the major portion of the egg whites.

Still another method which has been suggested has been to force the liquid egg material through positively acting cutting elements positioned transversely of the line of flow of the egg material in order to comminute the membranous constituents thereof and to provide a homogeneous product. Here again the practice of the process still leaves something to be desired from the standpoint of the excellency and uniformity of the product, particularly when subjected to subsequent steps of controlled fermentation followed by drying.

I have evolved a novel treatment of liquid egg material which is simple and inexpensive to carry out and produces a uniform, homogeneous product which, particularly in the case of mixed yolks and whites, is eminently adapted for use as one step of a complete processing operation and results in marked economies of operation and improved characteristics in the final product.

It is one object of my invention to provide an improved method for treating liquid egg material.

Another object is the provision of an improved method for treating liquid egg material whereby the separation of chalaza and foreign bodies is greatly facilitated and a much more uniform product is produced.

A still further object is the provision of an improved filtering method for filtering liquid egg material.

In general, my invention is accomplished by providing a suitable straining septum, such as a relatively fine mesh screen, between a body of filtered liquid egg material and a body of unfiltered liquid egg material, with provision for inducing flow of the liquid egg material in the direction of the filtered liquid egg material while concomitantly imparting relatively rapid movement to the screen, preferably accompanied with a change in the direction of movement thereof. A relation is maintained between the rate at which material tends to enter the interstices of the screen to clog it and the action in releasing or rejecting by the screen particles which would tend to clog it, so that clogging does not occur. This function is facilitated by so constructing and arranging the parts that solid or semi-solid particles rejected by the screen will not again fall back upon the screen and require their repeated rejection by the screen, and a consequent concentration of such materials at the screen surface. Preferably the pressure, such as the hydrostatic pressure, utilized to promote the movement of the liquid egg material through the screen, is of a low order. The movement of the screen not only results in inhibiting or greatly delaying the clogging action of the fine mesh orifices, but it also permits the use of a finer strainer or screen, or, assuming there is no change in the mesh of the screen, it results in a much greater volumetric flow than would normally take place without the screen movement. Other features and functions will be pointed out after a description of the preferred embodiment shown.

In the preferred embodiment of the invention, I provide a cylindrical screen body of fine mesh material which is continually subjected to relatively rapid vibrational movement about its axis. Liquid egg material is introduced into contact with the screen on one side thereof, preferably the outside, and the filtered liquid egg material is removed from the other side of the screen, preferably from within the circular area defined by the screen body. By continuously supplying unfiltered liquid egg material to the outside of the cylindrical screen body and continuously removing filtered liquid egg material from the inside of the cylindrical screen body while the screen body is being relatively rapidly reciprocated, unusually large capacity is obtained when only a relatively small difference in level is maintained on opposite sides of the screen.

Other objects and features of the invention will be apparent from a consideration of the following detailed description taken with the accompanying drawings, wherein.

Figure 1:
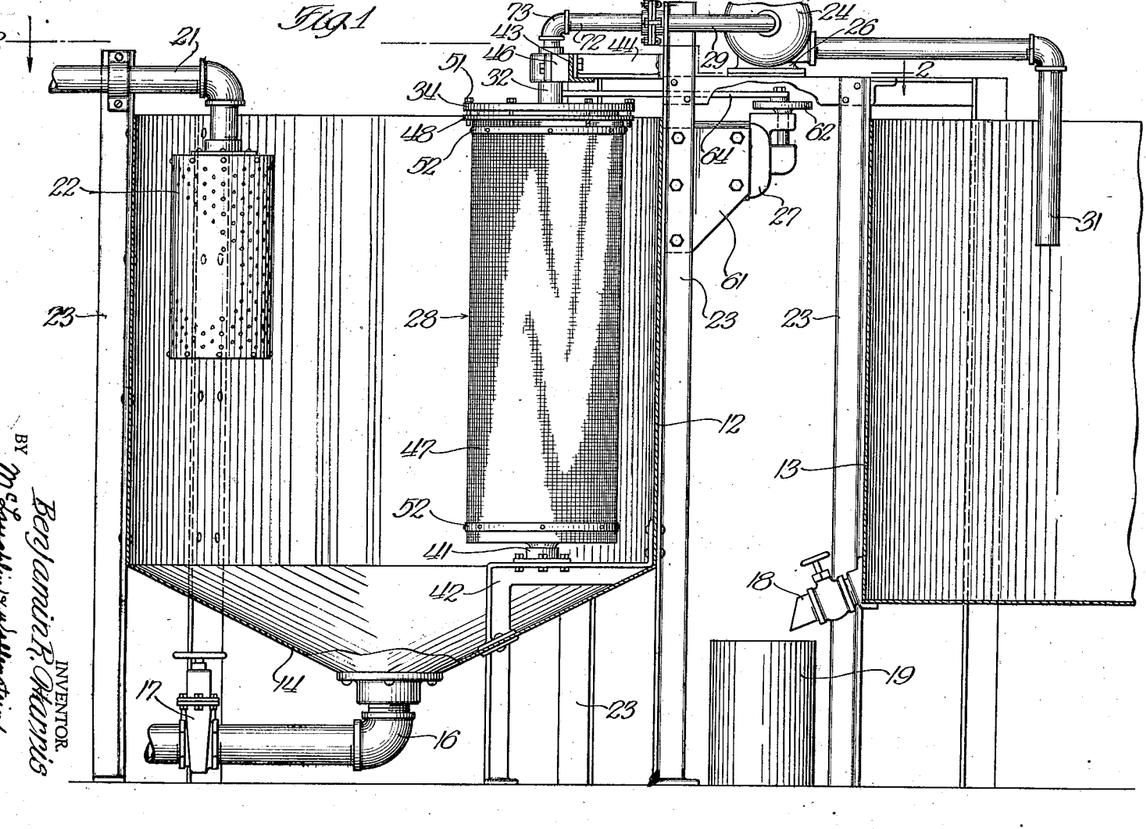
Fig. 1 is an elevational view showing one embodiment of the equipment, utilized in the practice of my invention, of my invention as mounted within a common style of stainless steel tank such as employed in the egg processing industry.

Referring now to the drawings, the numerals 12 and 13 identify tanks of the type employed in egg processing plants for the storage, treatment, etc., of liquid egg material. The tank 12 is shown as having a tapered bottom 14, with a drain line 16 in which is inserted a gate valve 17. The tank 13 is shown with a valved drain connection 18 for delivery of liquid egg material into a commercial type of container 19. In the arrangement shown in the drawings, the liquid egg material is delivered through a pipe 21 and conventional coarse strainer 22 into the tank 12. The material introduced into the tank 12 is processed in accordance with the present invention by the equipment as shown and which will now be described, is thence delivered into the tank 13 and from tank 13 it may be withdrawn to be handled in any suitable manner which may include introduction into the container 19.

The tanks 12 and 13 are supported by angle members 23, which, together with cross members, form a frame for the attachment of equipment including a pump 24, motor 26 for operating the same, a motor 27 for imparting vibration to the screen body indicated generally by the reference character 28, and the related operating parts. The liquid egg material which has passed through the screen is pumped through a pipe 29 to pipe 31 by the pump 24 and thence delivered to the tank 13. For the purpose of making clear the manner in which the screen body 28 is supported and driven, the construction as shown in the drawings and particularly in Figs. 8 to 11, inclusive, will now be described.

A central tubular supporting member 32 has near its upper end radially extending arms 33 which connect to an upper ring 34 forming part of the frame. At its lower end, the tubular supporting member 32 carries radially disposed arms 36 connected to a generally cup-shaped member comprising a ring portion 37 and bottom portion 38. The tubular member 32 and parts integral with it comprise a screen supporting frame for carrying the screen and imparting movement to it as will be described. Centrally of the bottom portion 38 of the frame is a pin or boss 39 journaled in a bearing 41 carried by a frame member 42 disposed within the tank 12. This positions the screen body at the bottom thereof. At the top an angle iron 43 (see Fig. 2) and T-bar 44 connected to the upper rim of the tank 12 and forming a part of the main frame structure together carry a bearing member 46 in which the upper part of the tubular member 32 is journaled. By means of the upper and lower bearings described, the position of the screen body is established within the tank 12, and a support is provided which will permit free oscillatory movement about the axis of the screen body.

A cylindrical screen member 47 is secured at its upper edge to a flange ring 48 and at its lower edge to a flanged ring 49. The flange on the ring 49 is engageable against the bottom edge of the member 38. The flange on the upper ring 48 extends outwardly to occupy a position beneath a radially extending flange provided on the ring 34. Thus, when the parts occupy the position shown in section in Fig. 8, the bolts 51 extending through apertures in the flange on the ring 34 and threaded into apertures provided on the ring 48, may be screwed up uniformly to apply an even, uniform tension upon the screen 47, thus maintaining the screen in proper position upon its frame.

Figures 8, 9, 10, 11:
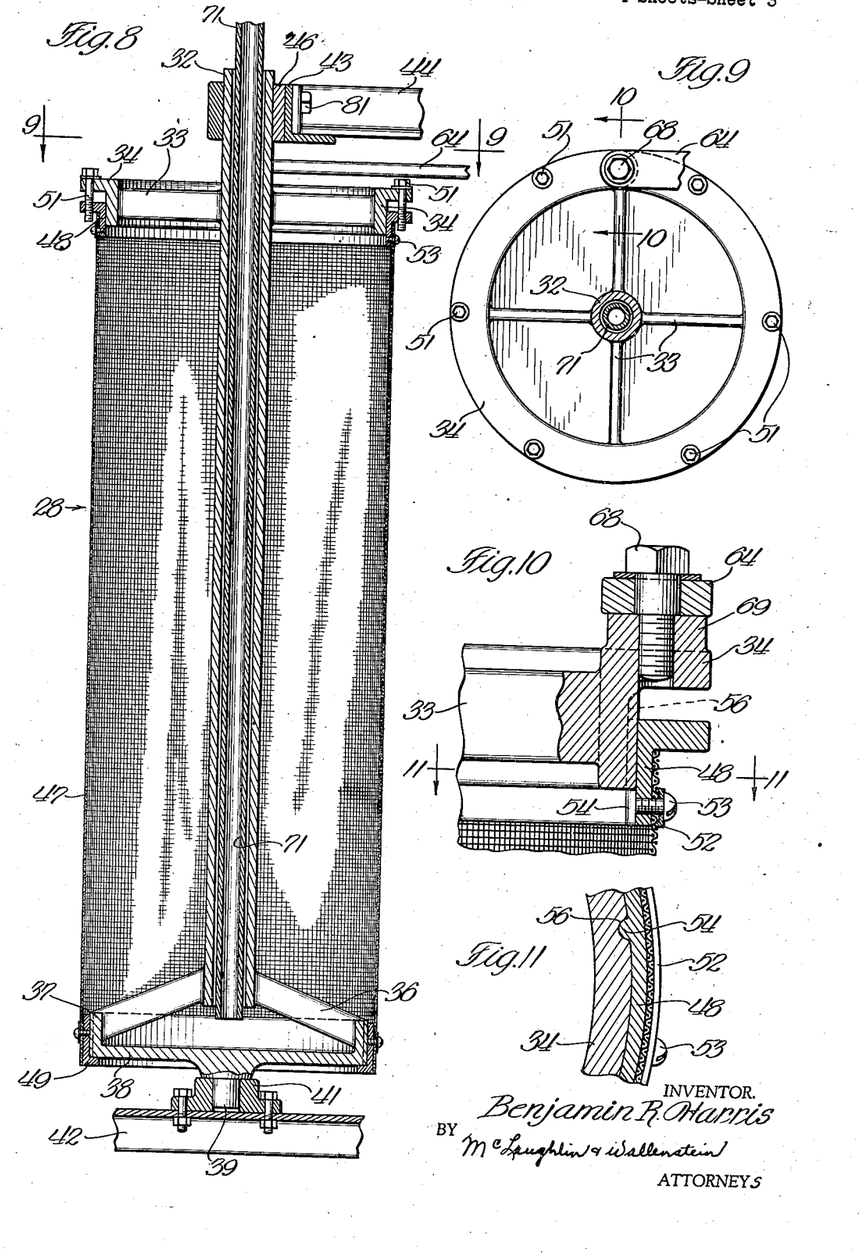
Fig. 8 is an enlarged sectional view showing the construction of the screen body which appears in elevation in Fig. 1.
Fig. 9 is a plan sectional view taken on the line 9—9 of Fig. 8, looking in the direction of the arrows, a driving arm shown in Fig. 8 being broken away in order better to show the relationship of the parts.
Fig. 10 is an enlarged sectional view taken on the line 10—10 of Fig. 9, showing certain structural details.
Fig. 11 is a fragmentary sectional view taken on the line 11—11 of Fig. 10.

The screen may be secured to the rings 48 and 49 in any suitable manner. As illustrated in the drawings, I utilize both at top and bottom a band 52 which is wrapped tightly around the edge of the screen extending over the ring in question, and held in place by machine screws 53. Fig. 10 illustrates this construction. By this or other suitable mechanical means, the screen 47 and the rings 48 and 49 are assembled so as to form substantially a single unit. To cause this unit to move with the remaining portion of the screen body, both of the rings 48 and 49 are provided with vertically extending ribs 54 engaging in grooves 56 provided in both the portions 34 and 37 of the supporting frame.

The result of this construction is an assembly wherein the main support is near the axis of rotation, and there is only a relatively very small amount of weight at the extreme outside of the mass which comprises the entire screen assembly. As a consequence, the screen body may be readily reciprocated at a high rate of speed by means of a relatively small motor and relatively light weight operating parts, the drive being through the screen supporting frame comprising the ring 34, the tubular supporting frame 32 and the bottom portion 37.

Figures 2, 3, 4, 5, 6, 7:
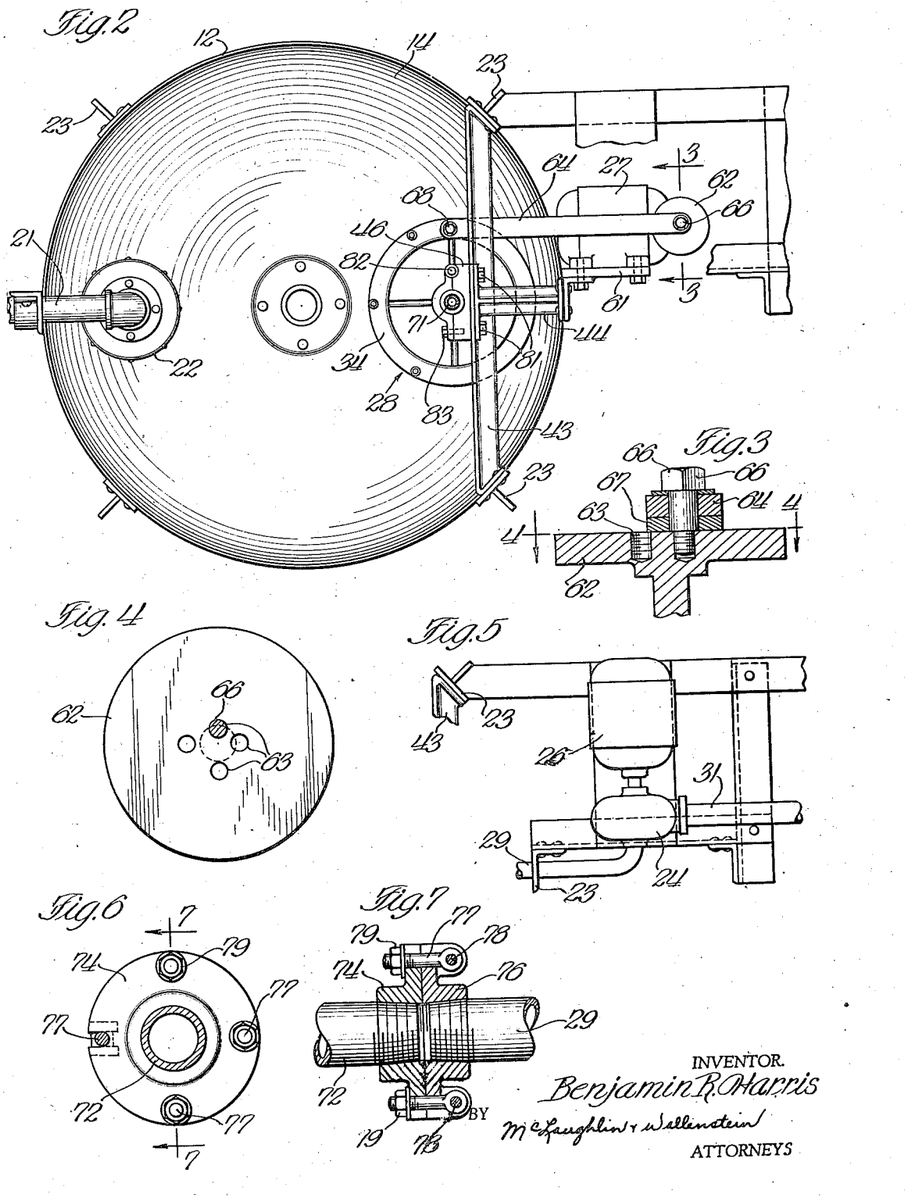
Fig. 2 is an irregular plan sectional view taken on the line 2—2 of Fig. 1, looking in the direction of the arrows.
Fig. 3 is an enlarged sectional view taken on the line 3—3 of Fig. 2, showing a feature of the drive utilized for imparting vibration to the screen body.
Fig. 4 is a plan sectional view taken on the line 4—4 of Fig. 3.
Fig. 5 is a fragmentary plan view showing a motor and pump for removing the treated egg material from within the screen body.
Fig. 6 is an enlarged sectional view showing a detail of a coupling.
Fig. 7 is a sectional view thereof taken on the line 7—7 of Fig. 6.

Referring now principally to Figs. 1 to 4, inclusive, the motor 27 is carried on a mounting bracket 61 attached to the main frame, and drives at normal motor speed a driving disk 62. This disk is provided with a plurality of threaded holes 63 bored parallel to the axis of rotation of the driving disk 62 and spaced varying distances from the center. A driving arm 64 is brought into operative relation with the driving disk 62 by extending a cap screw 66 through an opening provided in the end of the arm and threading the cap screw into the desired hole 63. As shown in Fig. 3, a spacer 67 is provided, and the cap screw has a shoulder engaging against the face of the driving disk 62 so that, when the cap screw is tightened into position, the arm 64 will be held firmly, but not tightly enough to cause binding. As shown in Fig. 10, the opposite end of arm 64 is attached to the periphery of the ring member 34 by means of a cap screw 68 threaded in a boss 69 formed on the upper surface of the ring member 34. By utilizing the boss 69, it becomes unnecessary to employ a spacer, and the boss also serves to provide adequate metal on the ring 34 at the point where the arm 64 is attached, while permitting the structure generally to be as light as possible consistent with the load carried. By means of the construction described, the amplitude of the reciprocatory movement imparted to the screen is readily controlled by merely changing the position at which the arm 64 is attached to the driving disk 62.

The pipe for withdrawal of the treated liquid egg material shown at 71 in Fig. 8 is extended through the center of the tubular frame support 32 to permit its being inserted substantially to the bottom of the space defined by the screen without possibility of interference with the free operation thereof. This pipe 71 is connected to a transverse pipe 72 by a suitable L-coupling 73, and to the pipe 29 leading to the intake side of the pump 24. To provide for readily detaching pipes 72 and 29, I utilize a special coupling arrangement as shown in detail in Figs. 6 and 7. Coupling members 74 and 76 are threaded on the adjacent ends of pipes 72 and 29, respectively. The coupling member 74 is provided with a plurality of edge slots, and coupling member 76 is provided with threaded fastening members 77 pivoted at 78 to swing into or out of the edge slots on the coupling member 74. By tightening nuts 79, the coupling members are brought firmly together in face to face contact. The drawings do not indicate the use of a gasket between the members 74 and 76, but it is understood that any usual means of packing or gasketing connections of this type may be employed. It is clear that the pipes 72 and 29 may be disconnected from each other without the requirement of turning either of them, by loosening the nuts 79 and swinging the fastening members 77 away from the coupling member 74. While other types of connecting means may be employed, it will be seen that the coupling disclosed has the advantage of being readily cleaned, an important feature when food materials are being handled.

In order to permit the ready removal of the entire screen assembly, the bearing 46 is constructed in two parts, one supported by the frame as shown by bolts 81 and the other pivoted at 82. A cap screw 83 maintains the bearing assembled as appears clear from Fig. 2. By merely removing the cap screw 83, the bearing may be separated, thus freeing the upwardly projecting portion of the tubular frame support 32.

In operating the equipment, liquid egg material is introduced through the pipe 21 and through the relatively coarse strainer 22, the tank 12 being filled to a level reaching almost to the top of the screen 47. The liquid egg material may be, for example, whole eggs treated with salt which renders them more fluid than normal untreated liquid egg material; they may be liquid whites; they may be previously treated yolks or any of the usual mixtures of yolks and whites process in egg establishments. As introduced into the tank 12, the liquid egg material may contain relatively small portions of foreign matter, such as parts of shells and the like, and, in addition, the liquid egg material will contain chalaza and some of the membranous materials forming a part of the egg as it is contained in the shell. Any relatively large substances, such as large pieces of shell which may be in the liquid egg material, are removed by the screen or trap 22. The remaining portions are removed by movement of the liquid egg material through the screen 47.

When the liquid egg material in the tank 12 has reached a sufficient height so that operations can begin, the motor 27 is started, the arm 64 having previously been adjusted to impart the proper vibratory movement to the screen. This movement of the screen facilitates the passage of the liquid egg material through the meshes of the screen and also has the effect of producing a much more homogeneous and desirable product than is obtainable by forcing the liquid egg material under pressure through a stationary screen in accordance with prior art practices. The pump 24 is operated to maintain the level of the liquid egg material within the area defined by the screen sufficiently lower than the level in the tank 12 to cause a suitable flow of liquid egg material through the meshes of the screen. In actual practice, the hydrostatic head established by the pressure differential need not be particularly great. I have found in actual practice that a difference in level of only a few inches will result in a marked and sufficiently rapid flow of the liquid egg material through the screen. It should be understood, however, that a difference in level is determined by practical operating conditions such as the liquid egg material being treated, the exact results desired, and the judgment of the operator.

The liquid egg material is withdrawn continuously from the inside of the screen and delivered to a suitable storage receptacle or other device for further treatment. The use of the tank 13 is purely illustrative. In carrying out a process employing the general arrangement shown in Fig. 1, the liquid egg material may, for example, be first treated with a suitable agent such as sugar, salt, a mixture of sugar and salt, or any suitable material depending upon the type of final product being produced. If we assume the production of a salt product, for example, which is to be subsequently frozen, the liquid egg material treated with salt is delivered to the tank 12, the filtered material is withdrawn from the screen, delivered to the tank 13, subsequently drawn from the tank 13 into suitable containers 19, and placed in a sharp freezing room. It should be understood that when I refer in the present specification to the processing of liquid egg materials by my invention, I am alluding to the filtration and processing of such liquid egg material by the use of the apparatus and method herein described without limitation as to treatments to which the liquid egg material may be subjected either before or after its subjection to the process of my present invention.

The apparatus may be operated for a relatively long period of time with little or no clogging of the meshes of the screen. The undesirable portion of the material introduced into the tank 12 gradually settles to the conical bottom portion 14 so that there is no excessive accumulation of matter rejected by the screen in the upper part of the tank 12. When the accumulation of matter rejected by the screen in the lower part of the tank 12 has increased to a point where it may have a deleterious effect upon the operation of the equipment, the valve 17 is opened and the relatively heavy foreign matter, membranous material and the like is withdrawn.

It will be understood that the fineness of the screen should be determined by practical operating conditions and the type of liquid egg material being treated. I have found that a screen having fifty meshes to the inch may be used suitably when the liquid egg material being processed comprises a product consisting essentially of yolk material and a relatively small proportion of whites to which about 10% of salt has been added. From the standpoint of equipment, as well as from the standpoint of the practice of the method, it is greatly preferred that the movement be a reciprocatory one about the axis of the screen. In actual operation, I have found that when about 5 to 6 oscillations per second are imparted to the screen, very good results are obtained when the movement of the screen is through an arc of somewhat less than five degrees. The periodicity and amplitude of movement, however, may be varied without impairing the results obtained. Using equipment of the character shown and operated in the manner described, the liquid egg material flows through the screen substantially as rapidly as delivered to the tank 12 and is withdrawn by the pump 24 when there is only a slight difference in level between the liquid egg material on the two sides of the screen. When under the same conditions, however, the screen is allowed to remain stationary, I find that only a small amount of liquid egg material will flow through the screen before it is completely clogged. More particularly, in a cylindrical device constructed of 50 mesh metal gauze 8 inches in diameter and 18 inches deep, with a solid metal bottom, treating, by the process of my invention, a yolk-egg white-common salt mixture containing 10% salt and having an overall solids content of 41%, under a hydrostatic head of one inch, 500 pounds were filtered in 20 minutes, and the screen at that time was in such condition that operation could have been continued without appreciable loss of capacity due to clogging. Using the same device, but in a stationary condition, and on egg material of identical composition, only 100 pounds could be passed through in 20 minutes; and, what is even more significant, the effectiveness of the device was impaired to such an extent that the operation had to be interrupted in order to clean out the material which had impacted the openings of the metal gauze The manner of assembling the equipment should be clear from the description thereof. I wish to point out, however, that all of the parts are readily removed for cleaning. If it is desired to replace the screen, the entire screen assembly is readily removed, after which the bolts 51 may be withdrawn and another screen 47 secured in place. In mounting the screen in position, it is only essential that enough tautness be maintained so that the screen will retain its cylindrical character when inserted into the body of liquid egg material in the tank. Due to the fact that there need be only a slight difference in level of the liquid egg material on the two sides of the screen, there is very little pressure on the screen because of the filtering action. Since the supporting weight is distributed substantially along the center line about which the movement occurs, the rapid vibrational movement does not result in placing an undue strain on the parts.

Those skilled in the art will readily understand that modifications in structure of the equipment and in operating technique may be made without departing from the teachings of the invention. For example, the screen may be an ordinary gauze, or cloth of suitable mesh, or other suitable filter or screen material, such as those formed of metal, textiles, spun glass and the like. Perforated metal may be used under suitable circumstances, or forms of screens or filters comprising bodies of discontinuous elements. Examples of the latter are miniature Raschig rings, Bergeat spirals, Prym or Lessing rings, Nori ribbed rings, or the like. When I refer to the use of a screen, septum or strainer, for example, the expression is not used in a limiting sense except as the context may indicate.

The movement of the screen has the effect of "shaking off" those particles which would normally enter the interstices or meshes of the screen and cause clogging. This "shaking off" action is apparently due to the fact that the screen, in moving, engages the particles in suspension and forces them out of the path which they would normally follow to enter the meshes of the screen. In other words, the force driving the particles away from the screen is greater than the force, such as a hydraulic head, which moves the particles toward the meshes of the screen. The movement of the screen should therefore be such that the liquid to be filtered is permitted to remain in such contact with the screen as to freely flow through the screen. The movement of the screen may be as well rotational, translational, centrifugal, oscillatory, vibrational, continuous or discontinuous, and the movement may be imparted to the screen in any suitable manner, such as mechanically, by means of supersonic waves, or the like. The forces involved are altered as the movement of the screen is changed, but such forces may more than overbalance the forces tending to deliver the solid particles to the meshes of the screen and cause clogging. The action of the screen is illustrated by the results which occur if air in the form of small bubbles is entrapped in the liquid egg material. These bubbles adhere to the side walls of the screen and function very much like solid matter against a stationary screen, and cause clogging. The bubbles, having very little mass, apparently are not "shaken off," thus further indicating that there is a positive force involved which rejects the relatively heavy solid or semisolid matter, but allows the normal liquid to pass the screen. For the reason explained, it is preferred that appreciable volumes of air be excluded from liquid egg material during the processing thereof, according to the present invention.

I wish to point out that the capacity of a strainer employed in accordance with my invention is very greatly increased over the capacity of a strainer of the same size and mesh when used in accordance with prior art practices. The force directing the material through the filter may be increased to increase capacity, but should not be sufficiently high to affect the function of the screen movement and cause clogging. Capacity may be increased in a given installation, therefore, by increasing the speed of movement of the screen to affect the increased flow of material, or by increasing the area of the screen, leaving other factors constant. It is plain that in starting and stopping a filtering operation, the factors involved are not identical with those during normal operation. For example, when liquid egg material is first introduced into the tank 12, there is no material within the area defined by the screen body. If the rise of liquid in the tank is gradual, it is simply necessary to set the screen in motion and withdraw no filtered material from within the screen until the height in the tank 12 has reached approximately the normal operating level.

I have already referred to the fact that the structure of the equipment may be altered. For one thing, the character of the screen may vary. All other factors being equal, I may employ a much finer screen than can be successfully employed if it remains stationary. The screen should preferably be so arranged that solid matter in suspension rejected by the screen will not tend to fall back on the screen. The screen surface, therefore, is preferably generally vertical, or, if horizontal, the flow should be from below. By completely enclosing the screen, it may be suspended entirely within the liquid, and the filtrate may be withrawn through a hollow trunnion or bearing, such as would be provided by forming the member 39 hollow and extending it through the bottom portion 14 of the tank. The filtrate may be removed by gravity, its flow suitably controlled, as well as by pump means. In place of a single cylinder as shown, the screen cylinder may be coaxial with a metal cylinder suitably arranged so that the filtrate may flow from between the cylinders. Many such modifications in structure are, of course, feasible.

Figs. 12 to 15, inclusive, illustrate generally the manner of utilizing the modifications discussed generally in the preceding paragraph. Looking first at Fig. 12, I show a cylinder 86 having a top 87 and a bottom 88, which may be attached thereto by means of threads as shown. The screen element comprises a frame structure 89 in the form of cross supporting members carried between top and bottom closure members 91 and 92, respectively, which entirely enclose the ends of the screen. These closure members 91 and 92 and the frame structure 89 comprise together a frame for supporting a straining element or septum 93, the construction being such that no material can pass from within the cylinder 86 to the portion thereof within the area of the straining element without passing through the meshes of the screen or other septum which may be employed. The closure member 91 carries an integral upwardly extending projection 94 which extends into a bearing 96 formed integrally as a boss on the top 87. A cap 97 completely closes the opening which would otherwise result at the bearing. At the bottom end, a hollow trunnion 98 is provided integral with the bottom closure member 92, and this hollow trunnion is journaled in a bearing 99 forming a part of the bottom portion 88 of the container which comprises the cylinder 86. At the portion where the hollow trunnion 98 projects below the bearing 99, an arm 101 is secured, this arm being shown as having a link 102 pivotally connected to it for reciprocating the arm 101 and the straining element with it from a suitable source of power. The bearings are shown simply arranged and with no special provision for lubrication, because the present invention does not relate either to lubrication or the manner of construction of bearings. It may be pointed out, however, that some materials which may be filtered will provide their own lubrication and no special form of lubrication of the bearings is required.

Figures 12, 13, 14, 15:
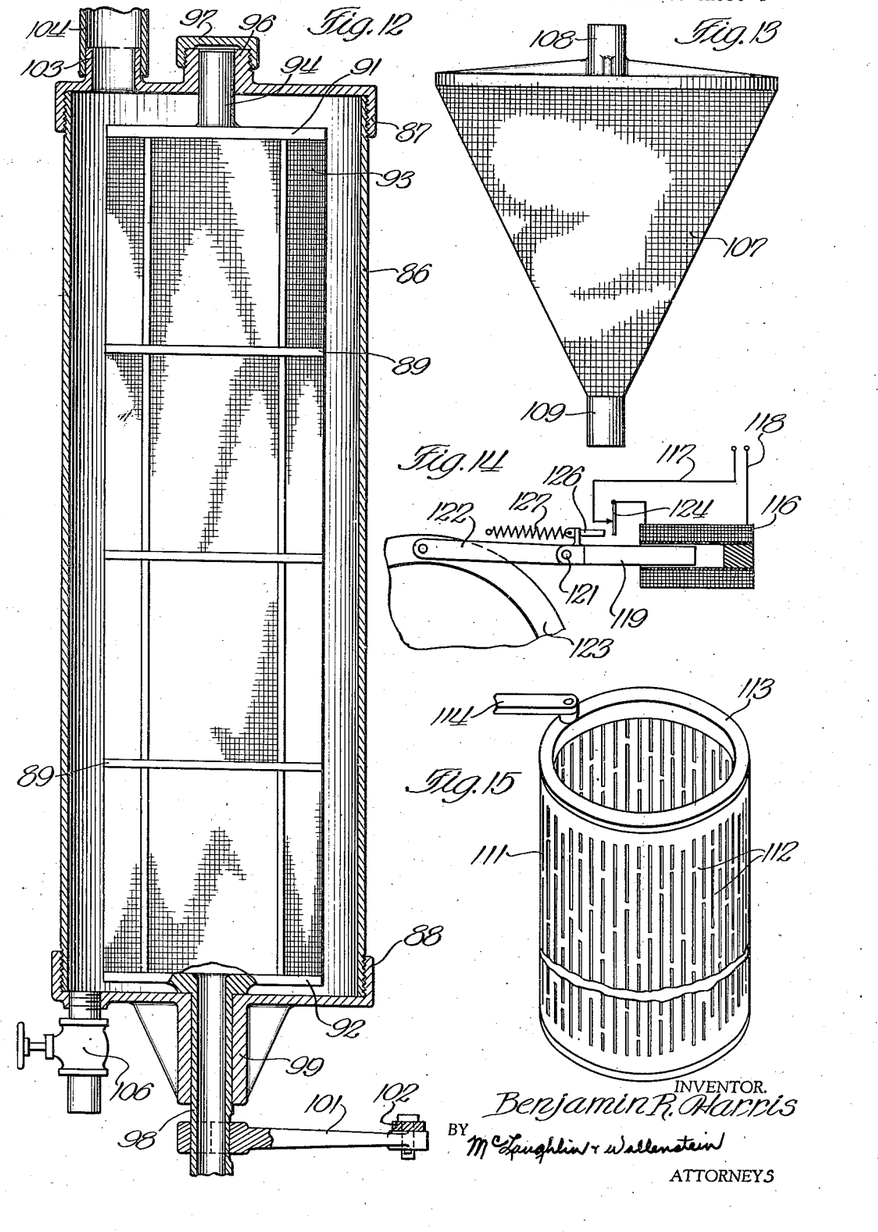
Fig. 12 shows a modified structure in which the straining device is arranged generally in the form of a so-called line strainer.
Fig. 13 shows another form which the straining element may take.
Fig. 14 illustrates a modified drive.
Fig. 15 shows another form of straining element.

In the top 87, I also provide an apertured boss or projection 103 to which a supply pipe 104 may lead. The material to be filtered, therefore, may be introduced through the pipe 104 and caused to fill the entire space between the outer surface of the straining element and the inner surfaces of the container which comprises the cylinder 86. Solid or semi-solid matter may be allowed to accumulate in the bottom of the container, or it may be periodically or continuously withdrawn through a valved drain line 106.

In operating the device shown in Fig. 12, the straining element may be entirely immersed in the liquid to be filtered and, if desired, the material may be fed in at the supply pipe 104 under some pressure. The system may, on the other hand, be left open to atmosphere, and the quantity of liquid to be filtered may be limited in order to maintain a level approximately at the upper limits defined by the screen or other septum used. Should the liquid to be filtered be delivered to the inside of the cylinder 86 under pressure, then it is essential that the forces resulting from the movement of the screen and resulting in the "shaking off" of solid or semi-solid particles be adequate to overcome at least in part the force of the particles moving toward the screen, otherwise stoppages will occur because of clogging. While these stoppages may not be as frequent as if the screen is allowed to remain stationary, as in the usual practice with line strainers of this type used in the egg industry, I consider it desirable to prolong as much as possible the operating periods between stoppages. The preferred arrangement obviously is to balance the operation in such a way, that, during the normal period, in an egg processing establishment, where liquid egg material is being filtered, the screen may be used continuously without shutting down for cleaning. If the operation of the screen may be controlled, as it can in accordance with the present invention, so that any cleaning which may be necessary can take place at a time when a straining operation is not normally being carried out, for example at the end of a day's run, then a considerable advantage in economy results.

The construction and assembly of the form of device shown in Fig. 12 in general is clear from the drawings. It may be pointed out, however, that the arm 101 is readily removed from the hollow trunnion 98, and the top 87 is readily removed from the cylinder 86. The entire strainer assembly may now be lifted out without difficulty. It will also be noted that, if the strainer is to be employed on materials which do not contain large proportions of solid or semi-solid material which will be rejected by the screen, the valved drain line 106 may be eliminated and the material rejected by the screen may be withdrawn through the bearing 89 when the strainer element is lifted. Due to the ease with which the strainer element may be removed, it may at times be desirable, in order to increase capacity in a given piece of equipment, to increase the force at which the material is delivered to the screen, knowing that the screen will be clogged at an earlier time than if the force employed were not so great. Under these circumstances, it takes only a few minutes to remove the screen element and insert another one, thereby permitting the operation to continue without an appreciable loss of time. In general, however, I prefer to so construct the apparatus that the equipment may be operated at least for the period of a normal day's run without having to shut down for cleaning purposes.

In Fig. 13, I show a strainer 107, having top and bottom bearing members 108 and 109, respectively. The strainer 107 is shown in the form of a cone. The device, as shown in Fig. 13, may be assembled within an outer container and may have movement imparted to it, such as described in connection with the other embodiments, so that solid or semi-solid matter will be rejected by the screen. It will be noted that as any of these particles tend to fall by gravity, they fall away from the screen and the number of times in which a given particle must be rejected by the screen is considerably decreased as compared to the situation when a cylindrical screen is used. Fig. 13 illustrates, therefore, that other forms of screens may be used to advantage and it will be understood that, in addition to cylinders or cones, the screens may have the shape or hemispheres, paralellopipeds and the like, or, depending upon the design, still other forms which lend themselves to movement in accordance with my present invention.

Fig. 15 shows another form of cylindrical screen 111 provided with a plurality of narrow slots 112. A ring 113, secured in any suitable manner such as by brazing, welding, or soldering to the top of the cylinder 111, carries an arm 114 through which movement may be imparted to the cylinder as a whole. The figure does not illustrate the manner of mounting a cylinder of this character, it being understood that any usual form of mounting means, such for example as shown in preceding embodiments, may be employed. I desire to point out, however, that a solid cylinder, provided with slits such as shown in Fig. 15, may comprise its own frame structure, thereby securing adequate strength and lightness, whereby there is less work involved in driving the screen in the manner contemplated by the present invention at an extremely high rate of speed. It will be understood that the form of the openings in the cylinder may vary. Where slits are employed, and assuming a cylinder about six inches in diameter and fifteen inches deep, these slits are preferably two to fourteen inches in length and one sixty-fourth of an inch wide, or narrower, depending upon the material to be filtered. These are merely illustrative figures for the guidance of those skilled in the art.

Fig. 14 is a more or less schematic view illustrating a modified manner of moving a straining element in a pulsating or reciprocating manner. Here I show a solenoid 116 to which a direct current line, illustrated by the conductors 117 and 118, is connected. A plunger type of armature 119 is pivotally fastened at 121 to an arm 122, which is in turn pivotally connected to a strainer element 123. A switch 124, inserted in that portion of the line comprising the conductor 117, is adapted to be opened by a projection 126 carried by the plunger 119 when the solenoid is energized and the plunger type of armature enters the solenoid. A spring 127 tends to move the armature in the opposite direction, and, on the breaking of the circuit by opening the switch 124, the spring comes into action and reverses the movement. The switch 124, being of a self-returning type, will again close the circuit when the projection 126 has been withdrawn. For simplicity, the arrangement is rather schematically shown, but it illustrates that, through electromagnetic means properly designed in accordance with the load involved, the straining element may be driven at a relatively high rate of speed. Fig. 14, therefore, is illustrative of only one form of modification which may take place in the driving mechanism. It will be understood that the design of the driving mechanism as well as the design of the entire apparatus should take into consideration the liquid material being treated and the functions required in that treatment. The balance of forces involved, the solid or semi-solid particles on the one hand tending to enter the meshes of the screen, and on the other hand tending to be driven away from the screen, is of prime importance so far as design is concerned.

As I have pointed out hereinabove, the result of the practice of my invention is not only to filter the liquid egg material but to bring it to such a homogeneous condition that improved results are obtained when such egg material is subsequently frozen, dried or otherwise treated.

I have not attempted to describe in any detail the forces involved in the action of the moving screen in "shedding" or "rejecting" solid or semi-solid material. Those skilled in the art of design and engineering principles as applied to dynamic bodies will see that there may be several causes for movement of the solid or semi-solid particles away from the screen, the simple matter of striking the solid particle and driving it away not being insignificant so far as the forces involved are concerned. The action of the screen in rejecting solid or semi-solid particles is not effective, however, against liquid or liquid-like components of the material being processed, since the liquid material is apparently always maintained in contact with the screen so that it has a smooth, easy flow through the meshes or interstices of the screen, filter or other septum used. If one can visualize particles becoming temporarily lodged within the meshes of the screen, then it will at once be apparent that when dealing with a cylindrical screen having rotatory movement some centrifugal action unquestionably is involved. I found that particles which are apparently small enough to pass through the meshes of the screen are nevertheless rejected by the screen and this may be explained in several ways and in part will itself serve to explain the action. A simple explanation is that, because of the rapid movement of the screen, the meshes thereof are in effect smaller than if the screen was stationary. Further explanation would take into account some centrifugal force and probably also the mere striking of solid or semi-solid particles by a projecting portion of the screen as the particle seeks a passage through the meshes thereof. This action of rejecting particles apparently finer than the meshes of the screen is the opposite of the experience found with what might be called static filters as contrasted with dynamic filters wherein, because of the high pressures which are used, particles apparently larger than the meshes of the screen are forced through.

This ability to remove by filtration very small solid or semi-solid particles has a very definite function and advantage when operating on liquid egg material. In the normal egg, there is a fine hair-like membraneous connection between the yolk and white, a protein-like material which is not removable from liquid egg material by any other straining method with which I am familiar. When liquid egg material is treated with salt, the objection to these thread-like particles is increased. On standing, these particles tend to settle, and sometimes are plainly visible in parts of a batch of material, thus deleteriously affecting the homogeneity and appearance of at least part of a batch of salt treated egg material. The process of my invention, suitably practiced with a screen of proper character, such as 40 or 50 mesh, decreases greatly or entirely eliminates these thread-like particles and other solid or semi-solid substances of the same general size which prior straining methods will not remove. Thus, I produce a new product of improved uniformity and clarity, having a more ready sale in the industries to which such materials go.

It must not be assumed from anything said above that my invention is limited to the treatment of only certain types of liquid egg materials. It may be used to great advantage in the treatment of whites alone, whole eggs, yolks, mixtures of yolks and whites other than found in whole eggs, and mixtures of any of the above with other materials.

While the invention may be used to advantage for the treatment of various types of liquid egg material, it is of very great value for the processing and filtering of a salt yolk product of the type referred to in a preceding example. Yolk material containing 10% of salt, some whites, with a total solid content of about 40% including the salt, is rendered quite fluid by the action of the salt. The result is that fine thread-like membranous matter, which is not removable by any other filtering or screening method with which I am familiar, has a tendency to settle to the bottom of containers in which the egg material is packed. The resulting product produces a non-uniform appearance. My invention results in the removal of this thread-like membranous matter, thus producing a new and improved product.

Previously, in this specification, I pointed out that the term screen was not used in a limiting sense except when the context so indicated. This statement obviously applies to the appended claims, which should be interpreted in the light of the specification.

What I claim as new and desire to protect by Letters Patent of the United States is:

1. The method of filtering liquid egg material whereby to effect removal of chalaza and other undesirable membranous particles, which comprises maintaining a body of unfiltered liquid egg material in direct contact with one side of a relatively fine mesh screen, and a body of filtered liquid egg material in direct contact with the other side of said screen, maintaining a pressure differential to cause movement of the unfiltered liquid egg material through the screen while simultaneously imparting relatively rapid oscillating movement to the screen, continuously withdrawing filtered liquid egg material, and supplying unfiltered liquid egg material whereby liquid egg material may be continuously moved through said screen at a rapid rate and substantially without clogging thereof over relatively long periods of time.

2. The method of filtering liquid egg material which comprises providing a vertically disposed, relatively fine mesh screen, maintaining a body of unfiltered liquid egg material on one side of the screen and a body of filtered liquid egg material on the other side of the screen, imparting relatively rapid reciprocating movement to the screen in a direction at right angles to a line drawn perpendicular thereto, and continuously withdrawing sufficient filtered liquid egg material to establish a hydraulic head and cause the filtered liquid egg material to pass through the screen.

3. The method of filtering liquid egg material whereby to effect removal of chalaza and other undesirable membranous particles which comprises providing a cylindrical screen of relatively fine mesh, imparting relatively rapid oscillating movement to said screen, maintaining a body of liquid egg material on one side of the screen under sufficient pressure to cause movement thereof through the screen, whereby liquid egg material passes through said screen and provides a body of filtered liquid egg material at the opposite side of the screen, and continuously withdrawing said filtered liquid egg material at a rate to maintain a flow of liquid egg material through said screen.

4. The method of filtering liquid egg material which comprises supporting a cylindrical screen of relatively fine mesh on a vertical axis, imparting relatively rapid reciprocating axial movement to said screen, maintaining a body of liquid egg material around the outside of the said cylindrical screen whereby liquid components will pass through the screen but solid and semi-solid components will be rejected by the screen, thereby delivering filtered material to the inside portion of said screen, and withdrawing filtered liquid egg material from within the screen whereby a hydraulic pressure differential is created causing continuous movement of the liquid egg material through the screen, and continuous filtering and mixing of such material takes place without clogging the screen over relatively long periods of time.

5. The method of filtering liquid egg material whereby to effect removal of chalaza and other undesirable membranous particles which comprises continuously passing liquid egg material, from a body thereof maintained in direct contact with a fine mesh screen, through said screen into a body of screened liquid egg material maintained in direct contact with the other side of said screen, while imparting rapid oscillating movement to said screen in a direction transverse to the direction of movement of the liquid egg material through the meshes of the screen, whereby continuous movement of the liquid egg material through the screen may be obtained at relatively low pressure and substantially without clogging of the screen over relatively long periods of time.

6. The method of filtering liquid egg material whereby to effect removal of chalaza and other undesirable membranous particles which comprises maintaining a body of unfiltered liquid egg material on one side and in direct contact with a relatively large, fine mesh screen, continuously passing liquid egg material through said screen while imparting relatively rapid reciprocating movement to said screen in a direction transverse to the direction of movement of the liquid egg material through the meshes of the screen, whereby continuous movement of the liquid egg material through the screen may be obtained at relatively low pressure and substantially without clogging of the screen over relatively long periods of time.

7. The method of filtering liquid egg material which comprises continuously passing liquid egg material through a relatively large, relatively fine mesh screen while imparting relatively rapid reciprocating movement to said screen in a direction transverse to the direction of movement of the liquid egg material through the meshes of the screen, whereby continuous movement of the liquid egg material through the screen may be obtained at relatively low pressure and substantially without clogging of the screen, the rapid movement of the screen causing the same to "shake off" solid and semi-solid matter, the screen being so positioned that such solid and semi-solid matter rejected by the screen will not fall back upon the screen.

8. The method of filtering liquid egg material whereby to effect removal of chalaza and other undesirable membranous particles, which comprises maintaining a body of such liquid egg material substantially free of air in direct contact with and on one side of a relatively large, fine mesh screen, and passing said liquid egg material free of air at low pressure through said screen while maintaining such screen in rapid oscillatory motion.

9. The method of treating a salted yolk product containing total solids of about 40%, which comprises passing said yolk product through a screen having relatively fine openings therein while rapidly reciprocating said screen in a direction transverse to the direction of movement of the yolk product through the openings therein, whereby the said yolk product may be filtered continuously substantially without clogging of the screen for a relatively long period of time and whereby fine thread-like membranous matter is removed.

10. The method of filtering liquid egg material which comprises maintaining a body of relatively substantial depth of unfiltered liquid egg material in direct contact with one side of a fine mesh screen, maintaining a body of relatively substantial depth of filtered egg material in direct contact with the other side of said screen, rapidly moving said screen to cause the same to "shake off" solid and semi-solid matter, the screen being so positioned that solid and semi-solid matter rejected by the screen tends to fall away from said screen, and continuously supplying unfiltered liquid egg material on one side of said screen while continuously withdrawing filtered liquid egg material from the other side of said screen.

11. The method of filtering liquid egg yolks which comprises supporting a generally cylindrical fine mesh screen on a generally vertical axis, rapidly oscillating said screen about its vertical axis, maintaining a body of liquid egg yolks around the exterior of said cylindrical screen whereby liquid components of said egg yolks pass through said screen but solids and semi-solid components are rejected by said screen, whereby filtered egg yolks are delivered to the inside portion of said cylindrical screen, continuously supplying liquid egg yolks to the exterior of said cylindrical screen and continuously withdrawing filtered liquid egg yolks from the interior of said screen.

12. The method of filtering a liquid egg yolk product which comprises providing a tank within which is disposed a generally cylindrical fine mesh screen supported on a vertical axis, rapidly oscillating said screen about its vertical axis through a relatively small arc, maintaining a body of a liquid egg yolk product within said tank and around the exterior of said cylindrical screen whereby liquid components of said egg yolk product pass through said screen but solids and semi-solid components are rejected by said screen, whereby a filtered egg yolk product is delivered to the inside portion of said cylindrical screen, continuously supplying the liquid egg yolk product to said tank exteriorly of said cylindrical screen and continuously withdrawing the filtered liquid egg yolk product from the interior of said screen.

13. The method of filtering liquid egg material whereby to effect removal of chalaza and other undesirable membranous particles which comprises providing a fine mesh screen filter surface, maintaining a body of unfiltered liquid egg material on one side of and in direct contact with said screen and at a predetermined level, maintaining a body of filtered liquid egg material on the other side of and in direct contact with said screen and at a level generally slightly lower than and in no case higher than the level of the body of unfiltered liquid egg material, rapidly moving said screen to cause the same to "shake off" solid and semi-solid matter, continuously supplying unfiltered liquid egg material to the body of unfiltered liquid egg material maintained on the one side of said screen, and continuously withdrawing filtered liquid egg material from the other side of said screen at a rate such as to maintain generally the level of the body of filtered liquid egg material in relation to the level of the body of unfiltered liquid egg material.

BENJAMIN R. HARRIS.